US006465090B1

(12) United States Patent
Stowell et al.

(10) Patent No.: US 6,465,090 B1
(45) Date of Patent: Oct. 15, 2002

(54) PROTECTIVE COATING FOR THERMAL BARRIER COATINGS AND COATING METHOD THEREFOR

(75) Inventors: William R. Stowell, Rising Sun, IN (US); Joseph Thomas Begovich, West Chester; Thomas Walter Rentz, Cincinnati, both of OH (US); Glen A. MacMillan, Simpsonville; John Greene, Simpsonsville, both of SC (US); Jane Ann Murphy, Middletown, OH (US); Dainel P. Ivkovich, Jr., Fairfield, OH (US); Andrew J. Skoog, West Chester, OH (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 09/690,860

(22) Filed: Oct. 17, 2000

Related U.S. Application Data

(63) Continuation-in-part of application No. 09/334,579, filed on Jun. 16, 1999, now Pat. No. 6,210,791, which is a continuation-in-part of application No. 08/564,859, filed on Nov. 30, 1995, now abandoned.

(51) Int. Cl.$^7$ .............................. F03B 3/12; B32B 15/04
(52) U.S. Cl. ....................... 428/325; 428/323; 428/332; 428/469; 428/450; 428/699; 428/702; 416/241 B
(58) Field of Search .................................. 428/621, 630, 428/632, 640, 687, 323, 325, 332, 469, 699, 702, 697, 446, 450; 416/241 R, 241 B

(56) References Cited

U.S. PATENT DOCUMENTS 5,660,885 A * 8/1997 Hasz et al.
5,851,679 A   12/1998 Stowell et al.
6,007,919 A   12/1999 Skoog et al.

* cited by examiner

Primary Examiner—Deborah Jones
Assistant Examiner—Jennifer McNeil
(74) Attorney, Agent, or Firm—Ernest Cusick; Gary M. Hartman; Domenica N. S. Hartman

(57) ABSTRACT

A protective coating and coating method for protecting a thermal barrier coating (TBC) on a component, such as a component of a gas turbine engine. The protective coating comprises alumina particles in a silica-containing matrix, and may be substantially homogeneous or formed of multiple layers having different compositions. The composition and relative amounts of alumina and matrix material in the protective coating enable the coating to react with molten compounds containing calcia, magnesia, alumina and/or silica (CMAS), forming a compound with a melting temperature that is significantly higher than CMAS. As such, infiltration of molten CMAS into the TBC is significantly reduced or entirely avoided.

18 Claims, 1 Drawing Sheet

PROTECTIVE COATING FOR THERMAL BARRIER COATINGS AND COATING METHOD THEREFOR

CROSS REFERENCE TO RELATED APPLICATIONS

This is a continuation-in-part patent application of co-pending application Ser. No. 09/334,579, filed Jun. 16, 1999, now U.S. Pat. No. 6,210,791 which is a continuation-in-part of patent application Ser. No. 08/564,859, filed Nov. 30, 1995, now abandoned. The disclosures of these applications are incorporated herein by reference.

FIELD OF THE INVENTION

This invention relates to coatings for components exposed to high temperatures, such as the hostile thermal environment of a gas turbine engine. More particularly, this invention is directed to a protective coating for a thermal barrier coating on a gas turbine engine component, in which the protective coating is resistant to attack by contaminants present in the operating environment of a gas turbine engine.

BACKGROUND OF THE INVENTION

Hot section components of gas turbine engines are often protected by a thermal barrier coating (TBC), which reduces the temperature of the underlying component substrate and thereby prolongs the service life of the component. Ceramic materials and particularly yttria-stabilized zirconia (YSZ) are widely used as TBC materials because of their high temperature capability, low thermal conductivity, and relative ease of deposition by plasma spraying, flame spraying and physical vapor deposition (PVD) techniques. Air plasma spraying (APS) is often preferred over other deposition processes due to relatively low equipment costs and ease of application and masking.

To be effective, TBC systems must strongly adhere to the component and remain adherent throughout many heating and cooling cycles. The latter requirement is particularly demanding due to the different coefficients of thermal expansion (CTE) between ceramic materials and the substrates they protect, which are typically superalloys though ceramic matrix composite (CMC) materials are also used. To promote adhesion and extend the service life of a TBC system, an oxidation-resistant bond coat is often employed. Bond coats are typically in the form of an overlay coating such as MCrAlX (where M is iron, cobalt and/or nickel, and X is yttrium or another rare earth element), or a diffusion aluminide coating. During the deposition of the ceramic TBC and subsequent exposures to high temperatures, such as during engine operation, these bond coats form a tightly adherent alumina ($Al_2O_3$) layer or scale that adheres the TBC to the bond coat.

The service life of a TBC system is typically limited by a spallation event brought on by thermal fatigue. In addition to the CTE mismatch between a ceramic TBC and a metallic substrate, spallation can be promoted as a result of the TBC being contaminated with compounds found within a gas turbine engine during its operation. A notable example is a mixture of several different compounds, typically calcia, magnesia, alumina and silica, referred to herein as CMAS. CMAS is a relatively low melting eutectic that when molten is able to infiltrate to the cooler subsurface regions of a TBC, where it resolidifies. During thermal cycling, the CTE mismatch between CMAS and the TBC (e.g., YSZ) promotes spallation, particularly TBC deposited by APS (hereinafter, "APSTBC") due to the ability of the molten CMAS to penetrate the porous structure typical of APSTBC. Various studies have been performed to find a TBC material that if deposited by APS is resistant to infiltration by CMAS, though none have been found sufficiently acceptable for production processes.

Accordingly, it would be desirable if the resistance of TBC to spallation attributable to CMAS infiltration could be improved.

BRIEF SUMMARY OF THE INVENTION

The present invention generally provides a protective coating and method for protecting a thermal barrier coating (TBC) on a component used in a high-temperature environment, such as the hot section of a gas turbine engine. The invention is particularly directed to a protective coating that significantly reduces if not prevents the infiltration of CMAS into an underlying TBC.

The protective coating of this invention comprises alumina particles in a silica-containing matrix, and may be substantially homogeneous or formed of multiple layers having different compositions. The composition and relative amounts of alumina and matrix material in the protective coating enable the coating to react with molten CMAS, forming a compound with a melting temperature that is significantly higher than CMAS. As such, infiltration of molten CMAS into the TBC is significantly reduced or entirely avoided. Instead, the new compound solidifies on the surface of the protective coating, and either remains adherent or spalls as small fragments that can be safely exhausted through the turbine engine.

In addition to addressing the vulnerability of TBC to spallation from CMAS contamination, the protective coating of this invention has additional properties advantageous to gas turbine engine components. For example, the protective coating is more erosion resistant than conventional TBC materials such as YSZ, and can be readily deposited to have a smoother surface finish that improves the aerodynamic performance of the component. The composition of the protective coating can also be tailored to have reduced transmissivity to infrared radiation, thereby significantly reducing the heating of the component by thermal radiation. In view of these benefits, the present invention is able to significantly extend the life of gas turbine engine components protected by TBC.

Other objects and advantages of this invention will be better appreciated from the following detailed description.

DETAILED DESCRIPTION OF THE INVENTION

Figure 1:
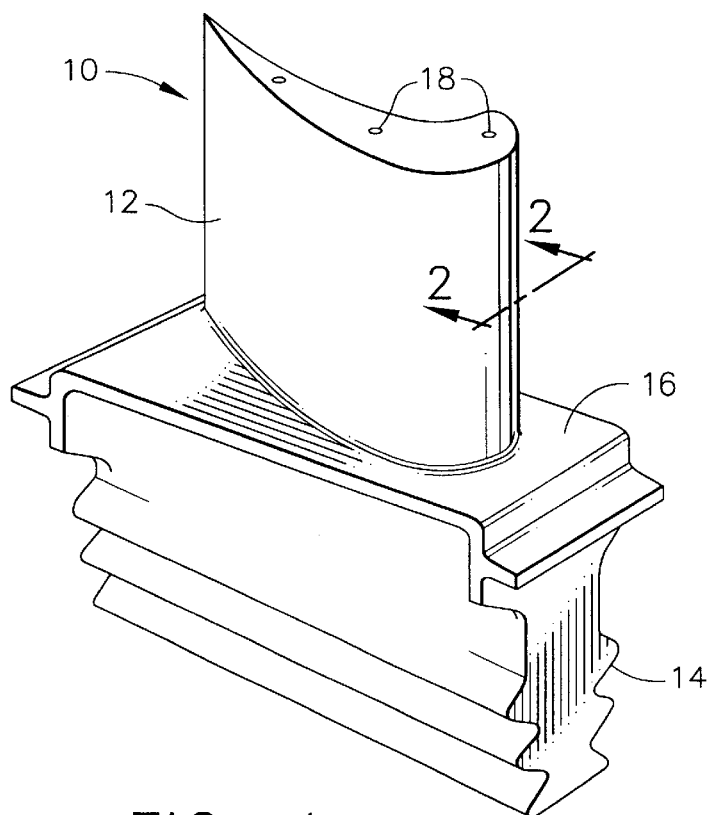
FIG. 1 is a perspective view of a high pressure turbine blade.

The present invention will be described in reference to a high pressure turbine blade 10 shown in FIG. 1, though the invention is generally applicable to any component that operates within a thermally and chemically hostile environment. The blade 10 generally includes an airfoil 12 against which hot combustion gases are directed during operation of the gas turbine engine, and whose surface is therefore subjected to severe attack by oxidation, hot corrosion and erosion. The airfoil 12 is anchored to a turbine disk (not shown) with a dovetail 14 formed on a root section 16 of the blade 10. Cooling holes 18 are present in the airfoil 12 through which bleed air is forced to transfer heat from the blade 10.

Figure 2:
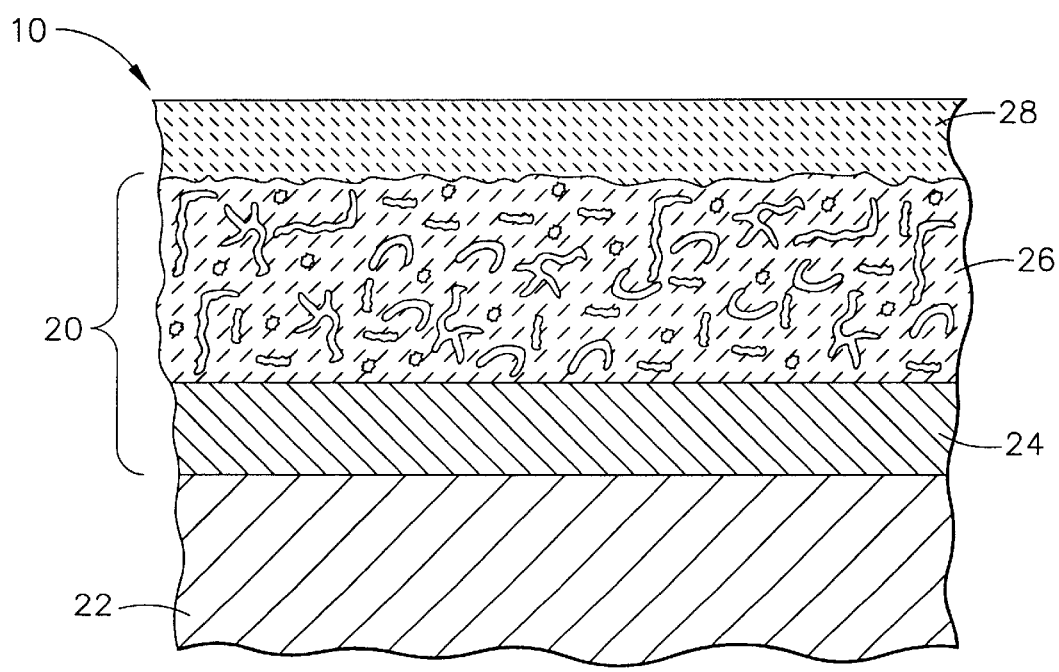
FIG. 2 is a cross-sectional view of the blade of FIG. 1 along line 2—2, and shows a protective coating overlaying a thermal barrier coating in accordance with this invention.

Represented in FIG. 2 is a thermal barrier coating (TBC) system 20 of a type known in the art. As shown, the coating system 20 includes a bond coat 24 overlying a substrate 22, which is typically but not necessarily the base material of the blade 10. Suitable materials for the substrate 22 (and therefore the blade 10) include equiaxed, directionally-solidified and single-crystal nickel, iron and cobalt-base superalloys, as well as nonmetallic structural materials including ceramic matrix composite (CMC) materials. The bond coat 24 may be an overlay coating such as MCrAlX (where M is iron, cobalt and/or nickel, and X is yttrium or another rare earth element), or a diffusion aluminide coating such as a platinum aluminide. The bond coat 24 is shown as adhering a thermal barrier coating (TBC) 26 to the substrate 22. A preferred material for the TBC 26 is an yttria-stabilized zirconia (YSZ), a preferred composition being about 3 to about 8 weight percent yttria, though other ceramic materials could be used, such as alumina, nonstabilized zirconia, or zirconia partially or fully stabilized by magnesia, ceria, scandia or other oxides.

The TBC 26 is depicted as having been deposited by air plasma spraying (APS), by which "splats" of molten material are deposited on the bond coat 24. As indicated, the TBC 26 has a degree of inhomogeneity and porosity that typically occurs in coatings produced by plasma spraying. In addition, the surface of the TBC 26 is relatively rough, with a surface roughness of 200 to 500microinches Ra (about 5 to 13 micrometers Ra) being typical for YSZ deposited by APS (APSTBC). While depositing the TBC 26 by APS is of particular interest to this invention, other plasma spraying techniques could also be used, such as low pressure plasma spraying (LPPS; also known as vacuum plasma spraying (VPS)). The TBC 26 is deposited to a thickness that is sufficient to provide the required thermal protection for the underlying substrate 22 and blade 10, generally on the order of about 75 to about 500 micrometers.

While many TBC systems use YSZ deposited by APS as the outermost layer, drawbacks include the roughness of the TBC surface, erosion resistance, and transmissivity to infrared (IR) radiation. Within the operating environment of a gas turbine engine, surface roughness increases turbulent heat transfer from the hot combustion gases to the component and reduces aerodynamic performance. While surface roughness can be reduced by polishing, such as tumbling or hand polishing, the final surface finish and thickness of the TBC cannot be closely controlled and the additional processing costs are undesirable. Though crystalline YSZ is very resistant to erosion, the erosion resistance of a YSZ APSTBC is significantly reduced as a result of its porosity and "microcrack" structure, the result of which is that fine particle bombardment dislodges small pieces of the TBC. In regard to IR transmissivity, analysis has shown that YSZ is about 20% to 40% transparent to thermal radiation (wavelengths of about 780 nm to about 1 mm) when deposited by APS to thicknesses of about 250 to 500 micrometers. As a result, the thermal protection provided by YSZ APSTBC is compromised in environments that have high thermal radiation loads, such as within a gas turbine engine. Finally, and of particular interest to the present invention, another shortcoming of many TBC materials, and particularly those deposited by APS, is their susceptibility to attack by CMAS. As discussed previously, CMAS is a relatively low melting eutectic that when molten is able to infiltrate conventional TBC and promote spallation during thermal cycling.

To address the above concerns, the TBC 26 in FIG. 2 is overcoated by a protective coating 28. As the outermost layer on the blade 10, the protective coating 28 determines the surface roughness of the blade 10. The protective coating 28 of this invention also serves as a barrier to thermal radiation, erosion and CMAS infiltration of the TBC 26. The protective coating 28 achieves these features of the invention as a result of its composition and methods of deposition.

The protective coating 28 is generally an alumina-base silica-bound ceramic material. More particularly, the protective coating 28 contains particles of alumina. ($Al_2O_3$) that are dispersed within a binder matrix composed of silica ($SiO_2$), silicates and/or mullite ($3Al_2O_3 \cdot 2SiO_2$), the relative amounts of which will vary depending on the firing temperature and subsequent service temperatures seen by the coating 28, with greater amounts of mullite forming at higher temperatures. The alumina particles constitute at least 5 up to about 85 weight percent of the outer protective coating 28, while the silica-containing binder matrix constitutes about 1 to about 45 weight percent of the protective coating 28. The relative amounts of alumina and silica-based matrix material in the coating 28 can be tailored depending on the properties desired for the coating 28. Higher silica contents depress the CTE of the coating 28 and promote glass formation, while higher alumina contents have the generally preferred opposite effect, since a higher CTE reduces the CTE mismatch of the coating 28 with a metallic substrate 22. Additional ceramic constituents for the coating 28 include zirconia (particularly YSZ), zinc titanate, and glass materials if present in appropriately limited amounts. For example, additions of zirconia are beneficial to increase the CTE of the coating 28, and additions of zinc titanate promote the reflectivity of the coating 28 to thermal radiation.

The alumina particles may be present within the protective coating 28 in two discrete particle size ranges. If such a bimodal size distribution is used, a suitable particle size range for the coarser constituent is about 3.0 to about 6.0 micrometers in diameter, the particles of which constitute about 15 to about 55 weight percent of the protective coating 28. A preferred alumina powder for the coarser constituent has a particle size range of about 3.0 to about 5.5 micrometers in diameter. A suitable particle size range for the finer alumina particles of a bimodal powder is about 0.05 to about 0.8 micrometers in diameter, the particles of which constitute about 8 to about 45 weight percent of the coating 28. A preferred alumina powder for the finer constituent has a particle size range of about 0.10 to about 0.6 micrometers in diameter. In the preferred size ranges, the finer particles are able to fill the spaces between the larger particles at the surface of the protective coating 28 to achieve a surface roughness of not more than about 2.5 micrometers Ra, typically in the range of about 1.5 to 2.5 micrometers Ra (about 60 to 100 microinches Ra), which is significantly smoother than that possible for the TBC 26 when deposited by APS (typically about 10 to 15 micrometers Ra (about 400 to 600 microinches Ra). Another benefit of the bimodal size distribution of the alumina particles is that at very high temperatures, silica within the matrix of the coating 28 preferentially reacts with the finer alumina particles to form a mullite phase.

Alumina powders for both the coarser and finer constituents are commercially available for use with this invention. For example, a suitable alumina powder for the coarser constituent is available under the designation A14 from ALCOA, which has a low soda content (NaO$_2$ <0.10 percent) and a surface area of about 0.5 m$^2$/g. A suitable alumina powder for the finer constituent is available under the designation Baikalox SM8 from Baikowski International Corporation, and has a surface area of about 10 m$^2$/g and an agglomerate size distribution (on a cumulative weight basis) of 65% below 0.3 micrometer, 78% below 0.4 micrometer, 95% below 0.6 micrometer, and 100% below 1.0 micrometer.

To achieve the desired surface roughness of not more than 2.5 micrometers Ra, the protective coating 28 must be capable of being deposited in such a manner as to have a smoother surface finish than the underlying TBC 26. In one embodiment, the protective coating 28 is deposited by spraying a slurry that contains the alumina particles, a precursor of the silica-containing matrix, and a carrier liquid or solvent. A suitable precursor for the slurry is a silicone such as polymethyl siloxane, a particular example of which is a resin manufactured by GE Silicones under the name SR350, and classified as a methylsesquisiloxane mixture of the polysiloxane family. A suitable carrier liquid is an anhydrous alcohol such as methanol or ethanol, though acetone, isopropyl alcohol or trichloroethylene could be used. A suitable slurry contains about 40 to about 65 weight percent of the alumina powder (preferably having the two particle size ranges discussed above), about 1 to about 45 weight percent of the silica precursor, and about 5 to about 90 weight percent of the carrier liquid. An additional and optional constituent is zinc titanate in amounts of up to about 50 weight percent of the slurry to promote the reflectivity of the coating 28 to thermal radiation. After being sprayed on the TBC 26 using any suitable sprayer known in the art, the composition can be dried at room temperature and then fired to yield a substantially homogeneous protective coating 28 with a surface roughness in the range of about 40 to 150 microinches Ra (about 1 to about 3.8 micrometers Ra). The composition of the sprayed protective coating 28 is preferably about 30 to about 55 weight percent of the coarser alumina, about 20 to about 40 weight percent of the finer alumina, up to about 30 weight percent zinc titanate (if present), and about 25 to about 45 weight percent of the silica-containing matrix. Suitable thicknesses for coatings 28 deposited by the spray method are in a range of about 25 to about 150 micrometers.

In an alternative deposition method, the protective coating 28 is formed by applying tapes of a suitable coating composition to the TBC 26. The tapes can generally be formed by casting the same constituents disclosed above as being sprayed on the TBC 26, though a greater amount of the silica precursor and a lesser amount of the liquid carrier may be used to increase the viscosity of the composition for facilitating the casting process. In addition, a surfactant is preferably included to promote wetting of the solids by the liquid components of the coating composition, and a plasticizer is preferably added to yield solid tapes that can be handled and applied. The tapes are preferably applied in layers, one over the other. In a preferred embodiment, tapes having different compositions are applied, so that after firing the coating 28 has inner and outer layers with different compositions. In addition to the constituents of the sprayed composition discussed above, tapes used to form the inner layer of the coating 28 may contain an additional ceramic powder constituent, such as a glass frit or zirconia, preferably YSZ, for improving the thermal expansion stress distribution through the coating 28. A suitable composition for a tape that will form the inner layer of the coating 28 is 0 to about 75 weight percent of a coarse alumina powder having a particle size range of about 3.0 to about 6.0 micrometers in diameter (e.g., the A14 powder disclosed above), about to about 55 weight percent of a fine alumina powder having a particle size range of about 0.10 to about 0.6 micrometer in diameter (e.g., the SM8 powder disclosed above), about 8 to about 40 weight percent of the silica-containing matrix, 0 to about 50 weight percent of an 8%YSZ powder having a particle size range of about 0.10 to about 2.5 micrometers, and optionally up to about 30 weight percent of a glass frit material, all of which are combined with a sufficient amount of carrier liquid, surfactant and plasticizer to yield a solid tape. Similar to the spray coating of this invention, a suitable precursor for the silica-containing matrix of the tape coating is a silicone such as polymethyl siloxane, a particular example of which is a resin manufactured by GE Silicones under the name SR355. This silicone is also classified as a methylsesquisiloxane mixture of the polysiloxane family.

The outer layer of the coating 28 preferably contains, in addition to the alumina powder and silica precursor, a glass frit material and zinc titanate (Zn$_2$TiO$_4$), the latter of which promotes the reflectivity of the coating 28. A suitable composition for a tape used to form the outer layer of the coating 28 is 0 to about 75 weight percent of a coarse alumina powder having a particle size range of about 3.0 to about 6.0 micrometers in diameter (e.g., the A14 powder disclosed above), about 20 to about 90 weight percent of a fine alumina powder having a particle size range of about 0.10 to about 0.6 micrometer in diameter (e.g., the SM8 powder disclosed above), about 8 to about 30 weight percent of the silica-containing matrix, up to about 30 weight percent zinc titanate, and up to about 30 weight percent of a proprietary glass frit material commercially available from Vitripak, Inc. under the name V212. While other glass frit materials could foreseeably be used, such as V55B and V213 glass frit available from Vitripak and 7052 glass frit available from Corning, the V212 material has been shown to be suitable for having a melting temperature and coefficient of thermal expansion that are compatible with the superalloy substrate 22 and the operating environment within a gas turbine engine. The above solid components are again combined with a sufficient amount of carrier liquid, surfactant and plasticizer to yield a solid tape. In a preferred embodiment, the outer layer does not contain a bimodal alumina powder, but instead is limited to the finer alumina powder, the result of which has been shown to improve infrared reflectivity of the outer zone of the coating 28.

The inner and outer tapes can be sequentially cast to form a two-layered tape or separately cast and then laminated together before being applied to the blade 10, or the tapes can be individually applied to the blade 10. In either case, the tapes are then fired to yield the coating 28, though with distinct inner and outer zones formed by the inner and outer tapes, respectively. A suitable composition for the inner zone of the coating 28 is 0 to about 75 weight percent coarse alumina, about 10 to about 55 weight percent fine alumina, about 30 to about 65 weight percent 8%YSZ, 0 to about 35 weight percent glass, and about 5 to about 20 weight percent of the silica-containing matrix. A suitable composition for the outer zone of the coating 28 is 0 to about 75 weight percent coarse alumina, about 10 to about 55 weight percent fine alumina, about 15 to about 40 weight percent zinc titanate, about 15 to about 40 weight percent glass, and about 5 to about 20 weight percent of the silica-containing matrix. It is foreseeable that the inner zone could further contain up to 30 weight percent zinc titanate, and that the outer zone could further contain up to 55 weight percent 8%YSZ. With the tape process, the thickness of the coating 28 can be readily tailored, with a preferred thickness being about 60 to about 250 micrometers. The surface finish attainable with the use of tapes will typically be in a range of about 20 to 100 microinches Ra (about 0.5 to about 2.5 micrometers Ra).

The thickness, structure and properties of the protective coating 28 can be tailored by the firing temperature and duration used. A suitable firing technique is to heat the sprayed composition or tapes at a rate of about 10° F. per minute (about 5.5° C./minute) to a maximum hold temperature of about 800° F. to about 2500° F. (about 425° C. to about 1370° C.). The hold temperature is held for a duration of at least one hour to convert the precursor to the desired silica-containing matrix and at least partially sinter the resulting ceramic constituents of the coating 28. The degree to which the coating 28 is sintered can be tailored for the service temperature of the TBC 26. In a preferred embodiment, the coating 28 is not sintered to full density, so that voids are present in the coating 28. The voids serve to reduce the thermal conductivity of the coating 28 as well as provide stress relief.

An important feature of the protective coating 28 of this invention it that it exhibits improved resistance to infiltration by CMAS as compared to TBC materials, particularly YSZ, deposited by APS. The protective coating 28 blocks the infiltration of CMAS into the TBC 26 by having a chemistry that reacts with CMAS to form refractory phases with higher melting temperatures or increases the crystallization temperature of CMAS. Specifically, the coating 28 has a sufficiently high alumina content that is present at or near the surface of the coating 28 to react with CMAS when this compound contacts the coating 28. The result is an alloying effect that increases the alumina content of CMAS above the eutectic point, yielding a modified CMAS with a sufficiently higher melting and/or crystallization temperature to cause the modified CMAS to solidify at the surface of the coating 28, where it either remains firmly adhered or subsequently breaks off in small pieces that can pass through the engine without damaging components downstream. The silica content of the coating matrix has a similar though less marked effect on CMAS that contacts the surface of the coating 28.

The voids within the protective coating 28 also potentially serve as radiation-scattering centers to significantly reduce heating of the blade 10 by thermal radiation. The voids are capable of providing this advantage by having an index of refraction different from that of the alumina particles and silica-containing matrix. Portions of the radiation propagated through the coating 28 are forward-scattered and back-scattered by the voids, similar to Mie-scattering that occurs when solar radiation is scattered in all directions by water droplets in the atmosphere. A suitable level of porosity for the protective coating 28 appears to be on the order of about 20% porosity, though lesser and greater levels of porosity are foreseeable. The voids form as a result of spaces between the alumina particles as well as from the decomposition of the organic portions of the matrix precursor and the carrier of the as-deposited coating composition. Preliminary examinations indicate that the voids have a size range of about 0.2 to 0.8 micrometers, with voids of lesser and greater sizes being foreseeable. Though void size is difficult to control with any precision, the size distributions resulting from the two preferred particle size distributions for the alumina particles appear to have the beneficial effect of reducing heating of the blade 10 by thermal radiation.

According to one embodiment of the invention, the surface of the protective coating 28 can be modified to promote the Mie-like scattering effect of the coating 28. To implement this capability, the outer surface layer of the coating 28 contains zinc titanate, preferably dispersed in an outer zone of the coating 28 such as that formed by the tape casting technique described above. To investigate this feature of the invention, testing was performed with superalloy specimens coated with a bond coat of NiCrAlY and 8% YSZ APSTBC having a thickness of about two mils (about 50 micrometers). Some of the specimens were additionally coated with a protective coating with improved Mie-like scattering in accordance with this embodiment of the invention. The protective coatings were formed by applying cast tapes whose compositions differed to define inner and outer zones of the coatings, as discussed previously. All tape compositions were formed by initially preparing a slurry that contained ethyl alcohol as a solvent, a surfactant commercially available under the name Merpol from Stephan, and the SR355 silicone as the silica matrix precursor. The composition used to form the tapes for the inner zone was, in weight percent, about 25% of the fine SM8 alumina powder, about 35% 8%YSZ, about 22% of ethyl alcohol as a solvent, about 3% Merpol as a surfactant, about 9% SR355 as a silica matrix precursor, about 4% polyvinyl butyral (e.g., B79 available from Solutia, Inc., of St. Louis, Mo. USA), and about 2% of dibutyl phthalate as an activator for polyvinyl butyral to form a plasticizer. The slurry used to form the tapes for the outer zone was about 29% of a fine alumina powder available under the designation A16SC from ALCOA, about 14% of the V212 glass frit material, about 14% zinc titanate, about 26% of ethyl alcohol, about 3% Merpol, about 9% SR355, and about 2% and 4% of dibutyl phthalate and polyvinyl butyral (B79), respectively.

The tapes were applied to the superalloy specimens and then sintered at a temperature of about 850° C. for a duration of about four hours to convert the SR355 precursor to the desired silica-containing matrix and yield a density of about 80% of theoretical. The inner zone on each specimen had a final thickness of about 100 micrometers and a final composition of, in weight percent, about 10% silica matrix, about 38% alumina particles and about 52% 8%YSZ particles. The outer zones were approximately 50 micrometers thick and contained, in weight percent, about 10% silica matrix, about 45% alumina, about 22% glass, and about 22% zinc titanate.

When subjected to thermal radiation from a gas torch directed perpendicularly against the protective coatings (resulting in surface temperatures in excess of 2500° F. (about 1370° C.), the specimens with the protective coating of this invention exhibited an average substrate temperature of about 100° F. (about 55° C.) less than that of the specimens without protective coatings. Such an improvement suggests that the service life of a high pressure turbine blade of a gas turbine engine could be more than doubled by coating the YSZ APSTBC with the protective coating of this invention.

Finally, the protective coating 28 of this invention also has been shown to exhibit better erosion resistance than YSZ APSTBC. In an investigation, three groups of superalloy specimens were prepared with YSZ APSTBC. The specimens were buttons of FSX-414 superalloy, having a nominal composition in weight percent of about 29.5% chromium, about 10.5% nickel, about 7% tungsten, up to 2% iron, about 0.25% carbon, and about 0.012% boron, the balance cobalt and incidental impurities. The TBC was,8%YSZ deposited to a thickness of about 5 to 12 mils (about 125 to 300 micrometers) over a NiCrAlY bond coat. The specimens of one of the groups were provided with protective coatings formed by tape casting to have the same composition described above for the Mie-like scattering investigation. A second group of specimens was provided with protective coatings formed by spraying a slurry of, in weight percent, about 30% percent of the A14 coarse alumina powder, about 22% of the SM8 fine alumina powder, about 19% of the SR350 precursor, the balance reagent alcohol. The protective coatings were sintered at a temperature of about 1650 to 2000° F. (about 900 to 1090° C.) for a duration of about one hour to yield a density of about 2.4 to 3.0 g/cc and a thickness of about 6 to 10 mils (about 150 to 250 micrometers). The final composition of the protective coatings applied by tape casting was essentially as before in the Mie-scatting investigation, while the final composition of the sprayed specimens was, in weight percent, about 37% weight percent silica matrix, about 37% of the coarser alumina particles, and about 27% of the finer alumina particles.

Comparative erosion tests were then performed to evaluate the erosion resistance of the protective coating of this invention. The specimens were erosion tested at room temperature for a period of about 0.1 to 1 minute with 50 micrometer alumina particles directed perpendicularly to the protective coatings from a distance of about 10 centimeters from the surface of the specimens. The specimens without the protective coating of this invention exhibited an average weight loss of about $2.5 \times 10^{-3}$ mg/g of TBC and an average erosion depth of about 23 micrometers/second. In comparison, the tape-cast and sprayed protective coatings exhibited an average weight loss of about $0.5 \times 10^{-3}$ mg/g and about $0.6 \times 10^{-3}$ mg/g, respectively, and an average erosion depth of about 6.5 micrometers/second and about 5 micrometers/second, respectively. The erosion resistance of the protective coating of this invention was therefore at least three times greater than that of the tested YSZ APSTBC.

While the invention has been described in terms of a preferred embodiment, it is apparent that other forms could be adopted by one skilled in the art, such as by substituting other TBC, bond coat and substrate materials, or by utilizing other methods to deposit and process the protective coating. Accordingly, the scope of the invention is to be limited only by the following claims.

What is claimed is:

1. A component having a thermal barrier coating on a surface thereof, the component comprising an outer protective coating overlying the thermal barrier coating, the outer protective coating comprising alumina particles in a silica-containing matrix, the alumina particles constituting about 5 to about 85 weight percent of the outer protective coating, and the silica-containing matrix consisting essentially of at least one of silica, silicate, and mullite, and constituting about 1 to about 45 weight percent of the outer protective coating.

2. A component according to claim 1, wherein the outer protective coating further comprises at least one of a glass material, a zirconia-based material, and zinc titanate.

3. A component according to claim 1, wherein the outer protective coating comprises two particle size ranges of the alumina particles, a first of the two particle size ranges being about 3.0 to about 6.0 micrometers, and a second of the two particle size ranges being about 0.05 to about 0.8 micrometers.

4. A component according to claim 1, wherein the alumina particles within the first particle size range constitute about 15 to about 55 weight percent of the outer protective coating, and the alumina particles within the second particle size range constitute about 8 to about 45 weight percent of the outer protective coating.

5. A component according to claim 3, wherein the alumina particles within the first particle size range constitute about 30 to about 55 weight percent of the outer protective coating, and the alumina particles within the second particle size range constitute about 20 to about 40 weight percent of the outer protective coating, the balance of the outer protective coating consisting of about 25 to about 45 weight percent of the silica-containing matrix and up to about 30 weight percent zinc titanate.

6. A component according to claim 1, wherein the outer protective coating further comprises an outer surface zone containing zinc titanate in an amount of about 15 to about 40 weight percent, and a glass material in an amount of about 15 to about 40 weight percent.

7. A component according to claim 6, wherein the outer protective coating further comprises an inner zone beneath the outer surface zone, the inner zone containing yttria-stabilized zirconia in an amount of about 30 to about 65 weight percent, and a glass material in an amount of up to about 35 weight percent.

8. A component according to claim 1, wherein the outer protective coating has a thickness of about 25 to about 150 micrometers.

9. A component according to claim 1, wherein the outer protective coating consists of the alumina particles in the silica-containing matrix.

10. A gas turbine engine component having a thermal barrier coating of partially-stabilized zirconia on a surface thereof, the component comprising an outer protective coating overlying the thermal barrier coating, the outer protective coating comprising alumina particles in a binder matrix, the binder matrix consisting essentially of at least one of silica, silicate and mullite, the alumina particles constituting about 5 to about 85 weight percent of the outer protective coating, the binder matrix constituting about 1 to about 45 weight percent of the outer protective coating, the outer protective coating having a surface roughness of not greater than 3.8 micrometers Ra.

11. A gas turbine engine component according to claim 10, wherein the alumina particles are present in the outer protective coating in at least two particle size ranges that do not overlap, a first of the two particle size ranges is about 3.0 to about 5.5 micrometers, and a second of the two particle size ranges is about 0.10 to about 0.6 micrometers.

12. A gas turbine engine component according to claim 11, wherein the alumina particles within the first particle size range constitute about 30 to about 55 weight percent of the outer protective coating, and the alumina particles within the second particle size range constitute about 20 to about 40 weight percent of the outer protective coating.

13. A gas turbine engine component according to claim 10, wherein the outer protective coating comprises about 25 to about 45 weight percent of the binder matrix, and up to about 30 weight percent of zinc titanate.

14. A gas turbine engine component according to claim 10, wherein the outer protective coating consists essentially of about 30 to about 55 weight percent of alumina particles in a particle size range of about 3.0 to about 5.5 micrometers, about 20 to about 40 weight percent of alumina particles in a particle size range of about 0.10 to about 0.6 micrometers, up to about 30 weight percent zinc titanate, and about 25 to about 45 weight percent of the binder matrix.

15. A gas turbine engine component according to claim 10, wherein the outer protective coating consists of about 37 weight percent of alumina particles in a particle size range of about 3.0 to about 5.5 micrometers, about 27 weight percent of alumina particles in a particle size range of about 0.10 to about 0.6 micrometers, and about 37 weight percent of the binder matrix.

16. A gas turbine engine component according to claim 10, wherein the outer protective coating comprises an outer surface zone consisting essentially of 0 to about 75 weight percent of alumina particles in a particle size range of about 3.0 to about 5.5 micrometers, about 10 to about 55 weight percent of alumina particles in a particle size range of about 0.10 to about 0.6 micrometers, about 15 to about 40 weight percent zinc titanate, about 15 to about 40 weight percent of a glass material, and about 5 to about 20 weight percent of the binder matrix.

17. A gas turbine engine component according to claim 16, wherein the outer protective coating further comprises an inner zone beneath the outer surface zone, the inner zone consisting essentially of 0 to about 75 weight percent of alumina particles in a particle size range of about 3.0 to about 5.5 micrometers, about 10 to about 55 weight percent of alumina particles in a particle size range of about 0.10 to about 0.6 micrometers, about 30 to about 65 weight percent yttria-stabilized zirconia, 0 to about 35 weight percent of a glass material, and about 5 to about 20 weight percent of the binder matrix.

18. A gas turbine engine component according to claim 17, wherein the outer surface zone consists of about 45 weight percent of the alumina particles in the particle size range of about 0.10 to about 0.6 micrometers, about 22 weight percent zinc titanate, about 22 weight percent of a glass material, and about 10 weight percent of the binder matrix, and wherein the inner zone consists of about 38 weight percent of the alumina particles in the particle size range of about 0.10 to about 0.6 micrometers, about 52 weight percent yttria-stabilized zirconia, and about 10 weight percent of the binder matrix.

* * * * *